March 28, 1939.  K. WENSCHOW  2,151,817
PROCESS FOR THE PRODUCTION OF PLANE PHOTOGRAPHS
HAVING PLASTIC OR RELIEF EFFECTS
Filed Sept. 22, 1937
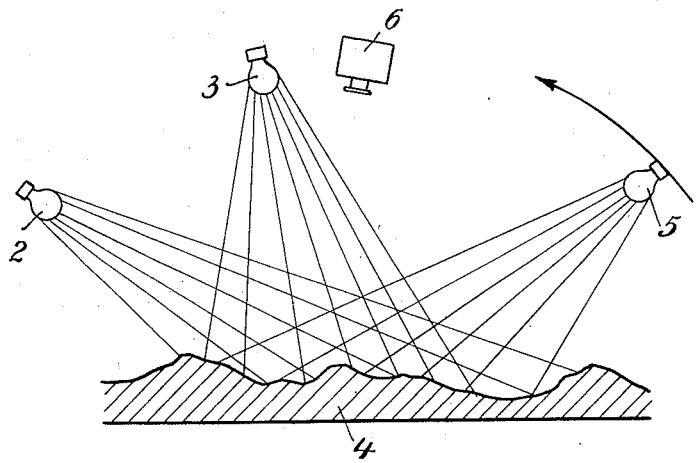
Inventor:
Karl Wenschow
Otto Munk
Attorney.

Patented Mar. 28, 1939

2,151,817

UNITED STATES PATENT OFFICE

2,151,817

PROCESS FOR THE PRODUCTION OF PLANE PHOTOGRAPHS HAVING PLASTIC OR RELIEF EFFECTS

Karl Wenschow, Munich, Germany

Application September 22, 1937, Serial No. 165,074
In Germany October 5, 1936

2 Claims. (Cl. 95—5)

Various proposals have already been made for the production of photographs of reliefs and the like, said photographs being situated in a plane and having a plastic or relief effect, more particularly for the production of suitable maps. One of these proposals was to illuminate the relief strongly and obliquely from one side whilst it was being photographed. It is true that a picture having a plastic effect was produced in this way, but there occurred broad and deep shadows as well as large light areas, the combined impression of which resulted in a defective representation of the ground, and in particular rendered the interpretation of the shaded parts difficult if not absolutely impossible. Another proposal was to illuminate the relief normally thereto from a considerable distance whilst it was being photographed. This proposal, however, possessed the disadvantage that a shadow effect could only be obtained from large elevations, and that where the elevations were small, no shadow effects occurred at all, while furthermore interpretation of the resulting photograph was made very difficult. It was therefore further proposed to illuminate the relief obliquely and uniformly from all sides, and for this purpose to provide a compact circle of lamps at a short or considerable distance from the relief, the lamps equally distant from the relief, alternatively to illuminate the relief to be photographed with parallel rays and to pass the reflected rays, collected by a plano-convex lens, to a photographic camera. The maps produced by this method no doubt exhibited a certain shading, but even according to these proposals, it was not possible to produce a really lifelike reproduction of the relief, for example of isolated elevations of ground, in such a manner as to provide the observer with a picture which was accurate and had a plastic effect in all parts.

The present invention which relates to the production of photographs situated in a plane and having a plastic or relief effect, is based on quite a different and novel point of view. According to the invention, it is not intended to produce the plastic or relief effect of the photograph, more particularly a map, by an increased toning of the oblique shadows on the lateral parts opposed to the source of light, nor is it intended to produce and utilise the tone values which are formed by the parallel irradiation of a relief and which can only be inadequately appreciated. On the contrary, it is intended to produce the effect of the lifelike plastic appearance by an individual variable illumination of the various parts of the relief, and to secure said effect by the fact that the relationship of the individual parts to one another is not destroyed by oblique shadows and the like undesirable phenomena, but is preserved intact and hence no differences whatsoever can be formed on the picture itself.

All this is secured according to the present new process by the fact that a relief prepared by known methods, which if desired is toned and/or provided with hatching in accordance with the differences in height, is exposed during the taking of the photograph, on the one hand to an oblique irradiation and if desired an additional normally directed irradiation, and on the other hand to an irradiation corresponding to the form of the ground, etc. for correcting the effect of the first irradiation, effected from the opposite direction, thereby at the same time lightening the otherwise too sharply pronounced shadows caused by the oblique illumination. Generally, for the correcting irradiation sources of light will be employed which are adjustable in intensity or are weaker than those employed for the oblique illumination the shadows of which said correcting irradiation is to soften. A practical basis for selecting the intensity of the sources of light employed for softening the shadows and acting from a direction opposite to oblique radiation is that they should be selected of substantially such intensity that the lettering illuminated by them on the relief is just well readable.

The invention is illustratively exemplified in the accompanying drawing, the single figure of which shows the relief in cross-section and the lighting arrangement in full view.

In the drawing, 4 is a relief which is lighted primarily by lamps 2 or 3 emitting rays which strike the relief at an oblique angle to the surface upon which the relief is built up. The relief is photographed by means of apparatus 6. A further source of light 5 is arranged in such a manner that the rays emanating therefrom illuminate the relief at an oblique direction opposite to that of the rays emanating from said main source of light. The intensity of said additional source of light is such that the letters and signs on the deeply shadowed portions of the relief surface are just recognizable.

By proceeding in this way, according to the invention, an excellent, lifelike, grading-toning effect, which is free from any unwanted oblique shadows and the other disadvantages of previous processes is obtained, and the photographed relief appears in the mountain ranges and in the plains extraordinarily plastic and lifelike and can be read easily and with certainty in all parts.

This lifelike, grading-toning effect of the opposed irradiations attainable according to the invention may, according to a further form of carrying out the invention, also be assisted in addition by previous grading-toning of the relief. Such grading-toning of the relief is carried out in a particularly expedient manner by mechanical means by suitable uniform or stepwise immersion and/or removal of the downwardly turned relief into or from a toning liquid, for example etching or colouring liquid, such as acids or the like, so that the more high situated layers of the relief are given a stronger toning than the lower layers and vice versa.

The general effect may be enhanced still further by causing important parts on the relief, such as roads, railways, rivers, lakes, woods, towns and the like likewise to appear in relief by means of a special hatching.

If the above-mentioned immersion and/or removal of the downwardly turned relief into or from the toning liquid is carried out slowly and uniformly, a suitably uniform transition is obtained from the lowest to the highest places on the relief and vice versa, which most effectively assists the grading-toning effect of the above-mentioned individual variable illumination, since thereby for example on a map, the conformation of the ground is shown particularly clearly and absolutely lifelike. On the other hand, by suitably stepped or intermittently effected immersion and/or removal, it is also possible to produce with ease and considerable precision any particular step-like grading which may be desired, for example as is usual in various general staff maps.

For the purpose of a suitable toning of the relief, the photographs may also be made by means of colour photography, which ensures a particularly lifelike, plastic effect.

If the configuration of the particular relief or the like to be photographed should present difficulties to the individual variable illumination to be carried out according to the invention, for example when there is an extensive, aboslutely flat central part entirely surrounded by considerable elevated ranges, such difficulties may be removed very simply by dividing the relief for taking the photograph into two or more parts conveniently accessible to the individual variable illumination according to the invention, and assembling their photographs to form the desired entire picture.

The photographs obtainable by the process according to the invention may be employed directly as basis for copying, for example for photomechanical printing, and the photographs thus produced have an absolutely lifelike effect on the observer. The further the eye is from the object, the more pronounced does the relief effect appear, and even for example in the case of maps of the smallest scale, all the conformations of the ground can be clearly recognised.

For this reason, the maps produced according to the invention, which instead of abstract signs for mountains, rivers and the like, show the surface of the earth as it really is, are particularly suitable for military requirements and observation training.

The process according to the invention, however, is not limited to the production of relief maps having a plastic effect and situated in one plane, but is also applicable to the reproduction of all other reliefs, full sculptures and other three-dimensional formations.

I claim:

1. A process for the production of plane photographs from an opaque relief map carrying signs and letters on its surface, which process includes the steps of illuminating said relief by a strong radiation directed obliquely to the surface on which the relief is built up, and simultaneously by a weaker radiation from a direction oblique to said surface at an inclination substantially opposite to said first stronger radiation, the intensity of said weaker radiation being just sufficient to render the letters and signs on those portions of the relief surface recognizable which are not reached by said first radiation, and photographing the relief so illuminated.

2. The process for the production of plane photographs from an opaque relief map carrying signs and letters on its surface, which process includes the steps of applying to the relief surface cross-hatching lines in accordance with the variation in elevation and other objects to be depicted on said surface, illuminating said relief by a strong radiation directed obliquely to the surface on which the relief is built up and simultaneously by weaker radiation from a direction oblique to said surface and at an inclination substantially opposite to said first stronger radiation, the intensity of said weaker radiation being just sufficient to render the letters, signs, and cross-hatching lines on those portions of the relief surface recognizable which are not reached by said first radiation, and photographing the relief so illuminated.

KARL WENSCHOW.